United States Patent [19]

Ninneman

[11] 4,136,146

[45] Jan. 23, 1979

[54] METHOD FOR FORMING TUBULAR PLASTIC ARTICLES

[75] Inventor: Lawrence D. Ninneman, Toledo, Ohio

[73] Assignee: Owens-Illinois, Inc., Toledo, Ohio

[21] Appl. No.: 738,508

[22] Filed: Nov. 3, 1976

[51] Int. Cl.² ........................ B29C 7/00; B29D 23/02
[52] U.S. Cl. .................................. 264/237; 264/297; 264/328; 264/336; 425/438; 425/537; 425/548; 425/556
[58] Field of Search ................. 264/97, 328, 329, 334, 264/336, 297, 237, 348; 425/438, 533, 537, 547, 548, 556, 577, 588

[56] References Cited

U.S. PATENT DOCUMENTS

| | | | |
|---|---|---|---|
| 2,853,736 | 9/1958 | Gussoni | 264/97 X |
| 2,974,362 | 3/1961 | Knowles | 425/537 X |
| 3,655,317 | 4/1972 | Funkhouser et al. | 264/334 X |
| 3,707,591 | 12/1972 | Chalfant | 264/97 |
| 3,784,348 | 1/1974 | Aoki | 264/97 X |
| 3,853,451 | 12/1974 | Bendzick | 425/438 |
| 3,944,645 | 3/1976 | Farrell | 264/97 X |

FOREIGN PATENT DOCUMENTS 221250 9/1968 U.S.S.R. ................................ 264/334

Primary Examiner—Jan H. Silbaugh
Attorney, Agent, or Firm—Richard D. Heberling; Myron E. Click; David H. Wilson

[57] ABSTRACT

A method and apparatus are disclosed for injection molding tubular plastic articles around cylindrical core pins at a molding station, for cooling the articles while supported on the core pins, and for then axially stripping the articles from the core pins at an ejection station. The article stripping step is accomplished by a horizontally reciprocable carriage which is selectively moved into and out of vertical alignment with a set of core pins and molded articles positioned at the ejection station. Sectional gripping members on the carriage are radially closable when in alignment with the molded articles, to grasp the articles for their axial removal from the core pins upon the horizontal displacement of the carriage. The stripped articles may be held in a horizontal cantilever position between the gripping members during an operational dwell time for additional cooling subsequent to their removal from the core pins.

5 Claims, 10 Drawing Figures

METHOD FOR FORMING TUBULAR PLASTIC ARTICLES

BACKGROUND OF THE INVENTION

This invention relates generally to the field of injection molding plastic articles, such as blowable plastic parisons, around a set of cylindrical core pins, cooling the articles while on the core pins, and then stripping the molded articles from the core pins for subsequent processing.

The art of forming bottles and containers by blow molding has advanced to the stage where several thousands of such articles can be formed each hour. This necessarily requires that the blowable parisons from which the articles are blown be formed rapidly and inexpensively, either by extrusion or injection molding techniques. In injection molding processes, it therefore becomes important to reduce the overall cycle time and to reduce the tooling expenses. Additionally, it is desirable in many situations that the parisons have a thickness profile to optimize material usage.

The prior injection molding machines have not provided these overall desirable features. For example, one prior art injection molding technique utilizes horizontally reciprocable molds including core pins which are telescopically inserted into an elongated horizontal mold cavity. This arrangement exhibits several shortcomings, including: first, difficulty in molding tapered parisons with controlled varying thicknesses; second, relatively high cycle times; and third, expensive tooling, for example, because cam-operated mold sections are needed to form the threaded finish.

SUMMARY OF THE INVENTION

The present invention overcomes these prior shortcomings and problems through an injection molding system which, in the total disclosed combination, includes a turret rotationally mounted about a vertical axis and having a plurality of horizontal sets of core pins radially extending outwardly from the turret. Several separate stations may be located along an arcuate path adjacent the turret, including particularly an injection molding station and a cooling and parison ejection station.

A pair of horizontally positioned mold sections are provided at the injection molding station and are relatively movable in the vertical direction to selectively close around the sets of core pins to form tubular injection molding cavities.

At the ejection station, a horizontally movable carriage is utilized to strip the molded articles from the core pins after they are swung into position by the turret. The horizontally movable carriage includes a plurality of semi-cylindrical sets of gripping surfaces which are formed on radially displaceable ejection blocks to selectively engage and disengage outer peripheral sections of the molded articles. The carriage itself is reciprocable between two primary positions. In the first of these positions, each set of gripping surfaces is radially aligned with a portion of a respective core pin at the ejection station; in the second of the positions, the gripping surfaces are horizontally displaced from the core pins. Displacement means are carried by the carriage for selectively closing the gripping sections around the molded articles at the first of the primary positions and for selectively opening the gripping sections at the second of the primary locations, to disengage the plastic article for ejection.

In an optional operation, the displacement means is operable to open the gripping surfaces after the carriage has remained at the second primary location for a dwell period, during which time the parisons are held in a horizontal cantilever position for additional cooling.

In another optional operation, the core pins may be indexed to a cooling station between the injection molding station and the cooling and ejection station. This optional station may include a cool air source directing a stream of cooling fluid onto the exterior surfaces of the thermoplastic articles to facilitate increased production rates.

In one of its broader aspects, the method includes axially aligning a molded article, such as a blowable tubular parison supported on a cantilevered, cylindrical mold surface, with a pair of radially spaced gripping surfaces which are laterally spaced from the cantilevered end of the mold surface and molded article. Then, the gripping surfaces are displaced in an essentially single, uninterrupted motion toward the supported end of the mold surface to a position in radial alignment with a portion of the molded article. During their displacement, the gripping surfaces are first moved toward the cantilevered end of the mold surfaces and then past the cantilevered mold surface end in radially spaced relationship from the molded article. Thereafter, the gripping surfaces are radially displaced toward the axis of the cylindrical mold surface to engage and grip a peripheral portion of the molded article. Finally, the gripping surfaces are laterally displaced in unison coaxially of the cylindrical mold surface away from the supported mold end to strip the molded article from the mold surface.

Again, an optional method step includes holding the molded article between the gripping surfaces in an essentially cantilevered position after the stripping step to continue cooling the article, and then radially displacing the gripping surface away from each other to disengage the article.

Accordingly, the present invention provides numerous advantages not found in the prior art. First, the invention utilizes a vertically movable injection mold which is partable along the axis of the mold cavities, permitting easy contouring of the parison outer diameter to reduce tooling and costs, in addition to permitting optimized material distribution. Second, the overall cycle is designed to maintain an injected parison on a cooled core pin as long as practical, in order to cool the parison to a non-deformable temperature. Third, an ejection system is provided to remove the molded articles from the core pins, and to optionally hold the molded articles in a cantilevered position during a portion of the overall operational cycle for further cooling. Further, the overall system enables the rapid production of cooled tubular parisons for later use in high production blow molding operations.

Other advantages and meritorous features of this invention will be more fully appreciated from the following detailed description and the appended claims.

BRIEF DESCRIPTION OF THE PREFERRED EMBODIMENTS

The Embodiment of FIGS. 1-5

Figure 1:
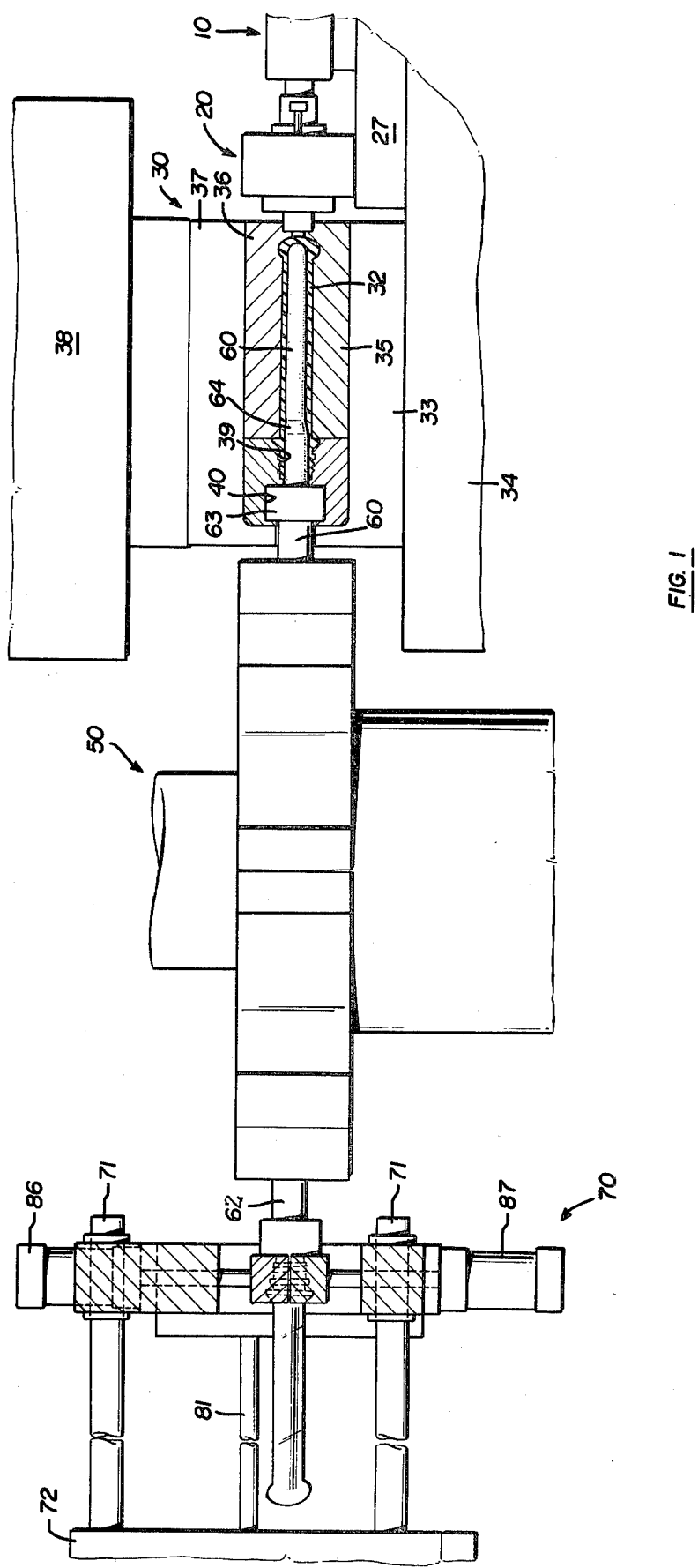
FIG. 1 is a side elevational view of the overall injection molding and ejection system, with partial cross-sectional illustrations for detail.

Referring more particularly to the drawings, FIG. 1 illustrates the overall molding and ejection system, including an injection machine 10, which supplies plasticized, flowable plastic material to an injection mold 30 by way of a runner housing 20. A rotatable and vertically movable turret 50 is interposed between the molding station 30 and a cooling and ejection station 70, and includes two sets of diametrically opposed and radially extending identical core pins 60 and 62, which are respectively positioned at the molding and ejection stations.

The plasticizer 10 may be of conventional design, such as a plunger-type or reciprocable screw-type machine, and includes a nozzle 12 which mates with an injection fitting 22 on the runner housing 20. A main runner line 23 extends transversely along the length of the runner housing 20 to supply flowable plastic material to a plurality of branch runner lines 24 formed by sprue bushings 25. An injection port 31 at the end of each injection mold cavity is axially aligned with the sprue bushings 25 to selectively receive plastic material for forming the tubular plastic articles. The selective opening and closing of the branch runner lines 24 is effected by a plurality of pin valves 26, which are commonly moved by conventional means (not shown), such as a hydraulic cylinder and piston and a common displacement plate. As shown in FIG. 1, the runner housing 20 is supported on a base plate 27 of a support 34. Additionally, the runner hosuing may include conventional heating cartridges (not shown) to maintain the plastic material in a heated flowable condition.

Figure 3:
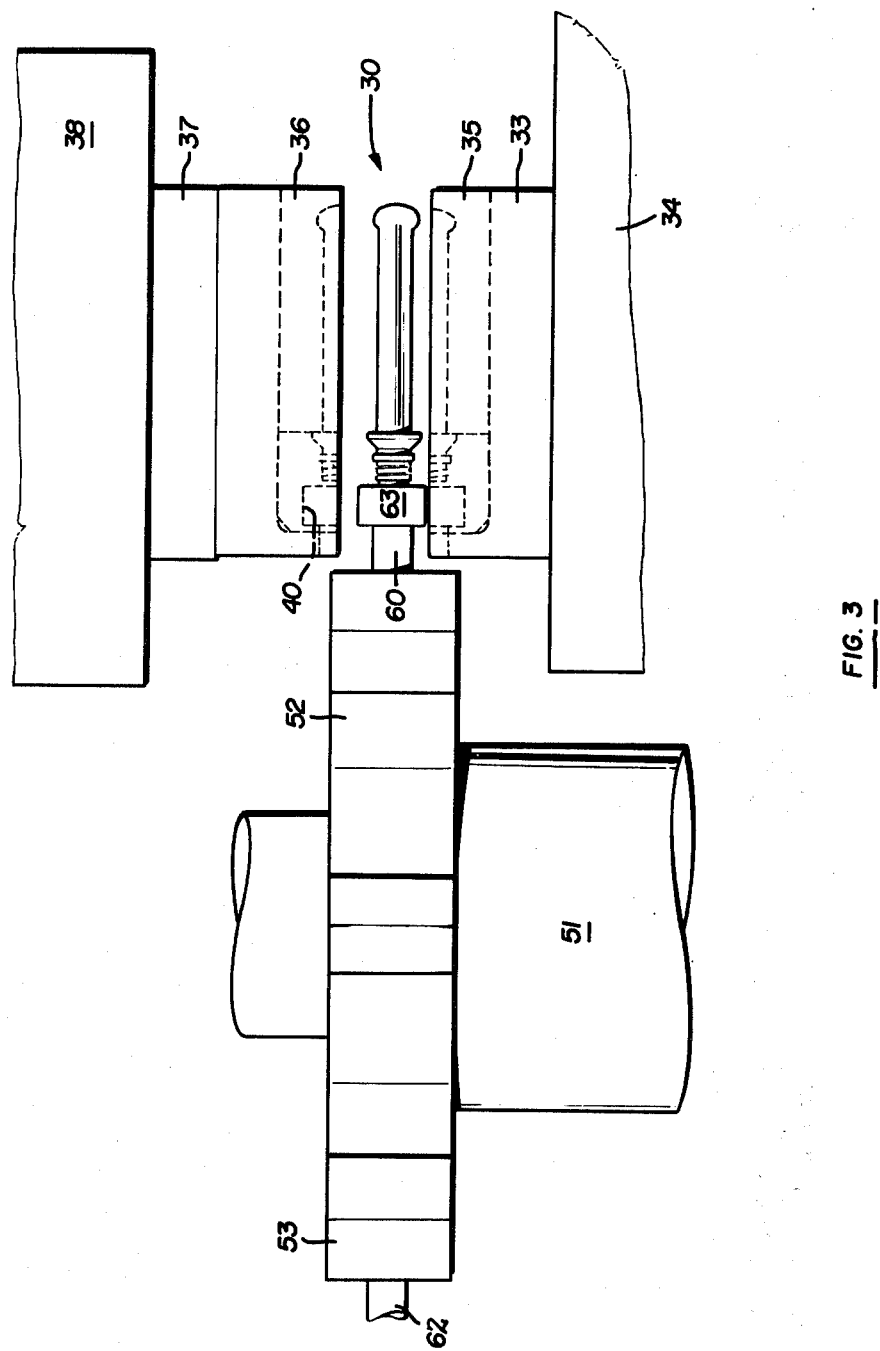
FIG. 3 is a side elevational view, illustrating the removal of the injection molded parisons from the mold cavities.

The injection molds include a lower fixed mold half 35 suitably secured to a fixed lower cavity retainer block 33 which is supported on the base 34. An upper mold half 36 is likewise suitably secured to an upper cavity retainer block 37 on upper press platen 38 that is vertically movable by suitable conventional power means (not shown). The upper and lower mold sections 35 and 36 have semi-cylindrical cavities and semi-cylindrical ports that collectively form the mold cavities 32 and the injection portions 31. Optionally, the mold halves may include finish and neck support contours 39. As shown in FIGS. 1 and 3, the mold halves may also include semi-cylindrical recesses 40 for receiving a sleeve or enlarged boss 63 on each of the core pins for the purpose of aligning the core pins within the mold cavities.

The rotatable turret 50 includes a vertically movable and rotatable support column 51 which is raised and lowered by conventional hydraulic power means (not shown) and which is rotated by conventional means (not shown), such as a rack and pinion. A pair of mounting blocks 52 and 53 are suitably secured to the rotatable turret and each carry a set of diametrically opposed cantilevered core pins 60 and 62, which extend radially away from the mounting blocks for selective placement at either the molding station 30 or the cooling and ejection station 70. The disclosed turret arrangement includes four illustrated core pins in each set, but this number may be varied as desired.

Figure 2:
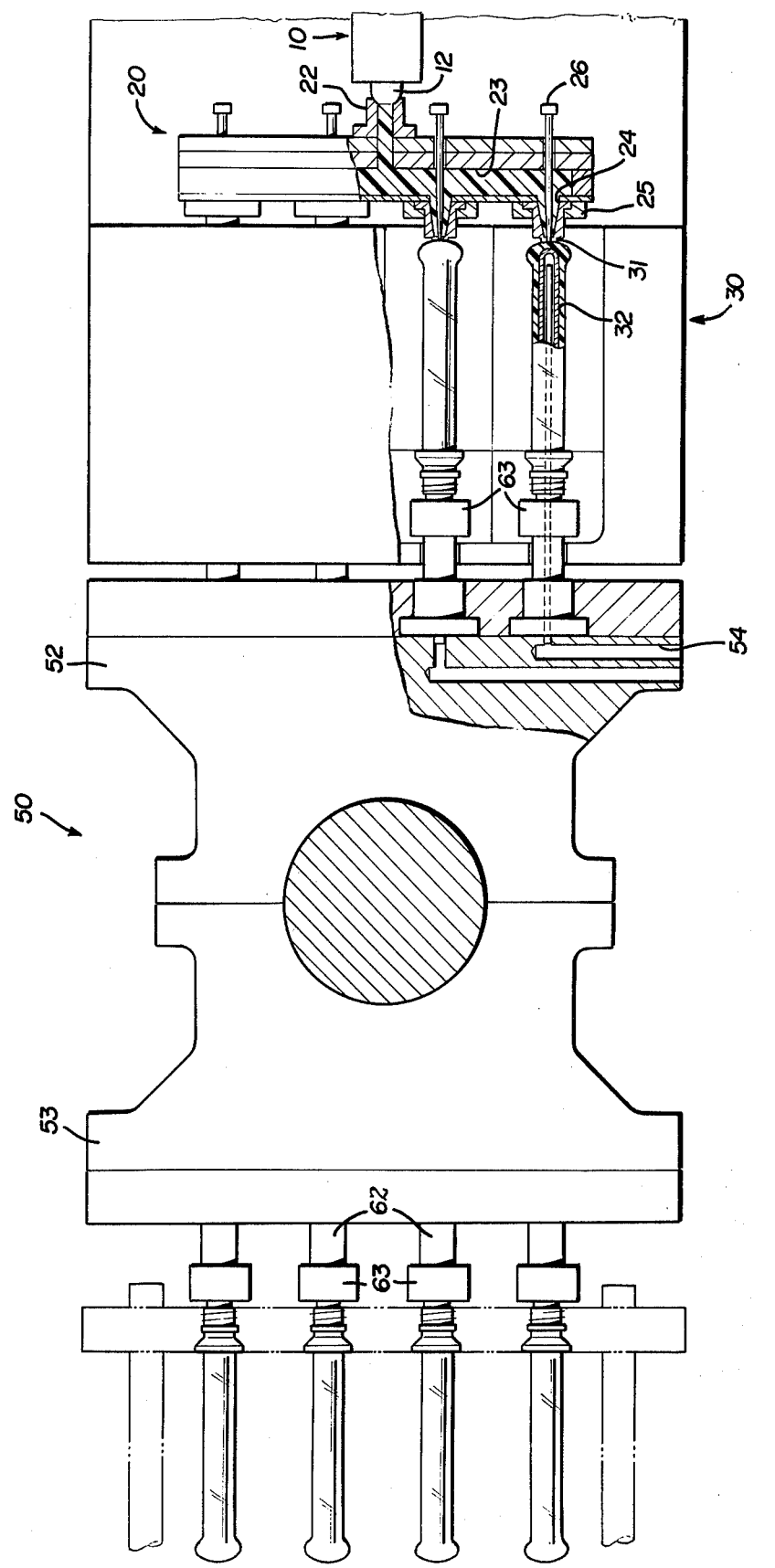
FIG. 2 is a top plan view similar to FIG. 1, with partial cross-sections illustrating the details of the injection molding station.

As shown in FIG. 2, somewhat conventional fluid delivery ducts 54 are formed in the turret mounting blocks to supply cooling fluid to the interior of the hollow core pins, to cool the plastic material as soon as it is injected into the mold cavity and then thereafter when the molded article is conveyed by the core pins to the ejection station. Further, FIG. 1 illustrates that the core pins may include a varying contour, as shown by frusto-conical tapering region 64 adjacent the finish and neck support region, for the purpose of varying the wall thickness of the molded parisons. Similarly the mold halves may be contoured to provide a desired wall thickness distribution, since the molds are partible along the axis of the core pins.

FIG. 3 illustrates that the mold sections part along the axis of the core pins to facilitate the stripping of the molded articles from the molding cavities. Opening of the molds may be effected in a variety of ways, but the preferred embodiment includes first raising the upper mold 36 to the position illustrated in FIG. 3. This enables the upper half of the molded articles to be initially stripped from only half the mold cavity surface. Thereafter, the turret is raised to the position shown in FIG. 3, stripping the lower half of the molded articles from the other half of the mold cavity surfaces and thereby exposing the articles to ambient air for an additional cooling effect. With the turret thus positioned, clearance is provided to rotate the turret about its vertical axis for swinging the set of cores pins 60 from the molding station along an arcuate path to the ejection station 70.

Figure 4:
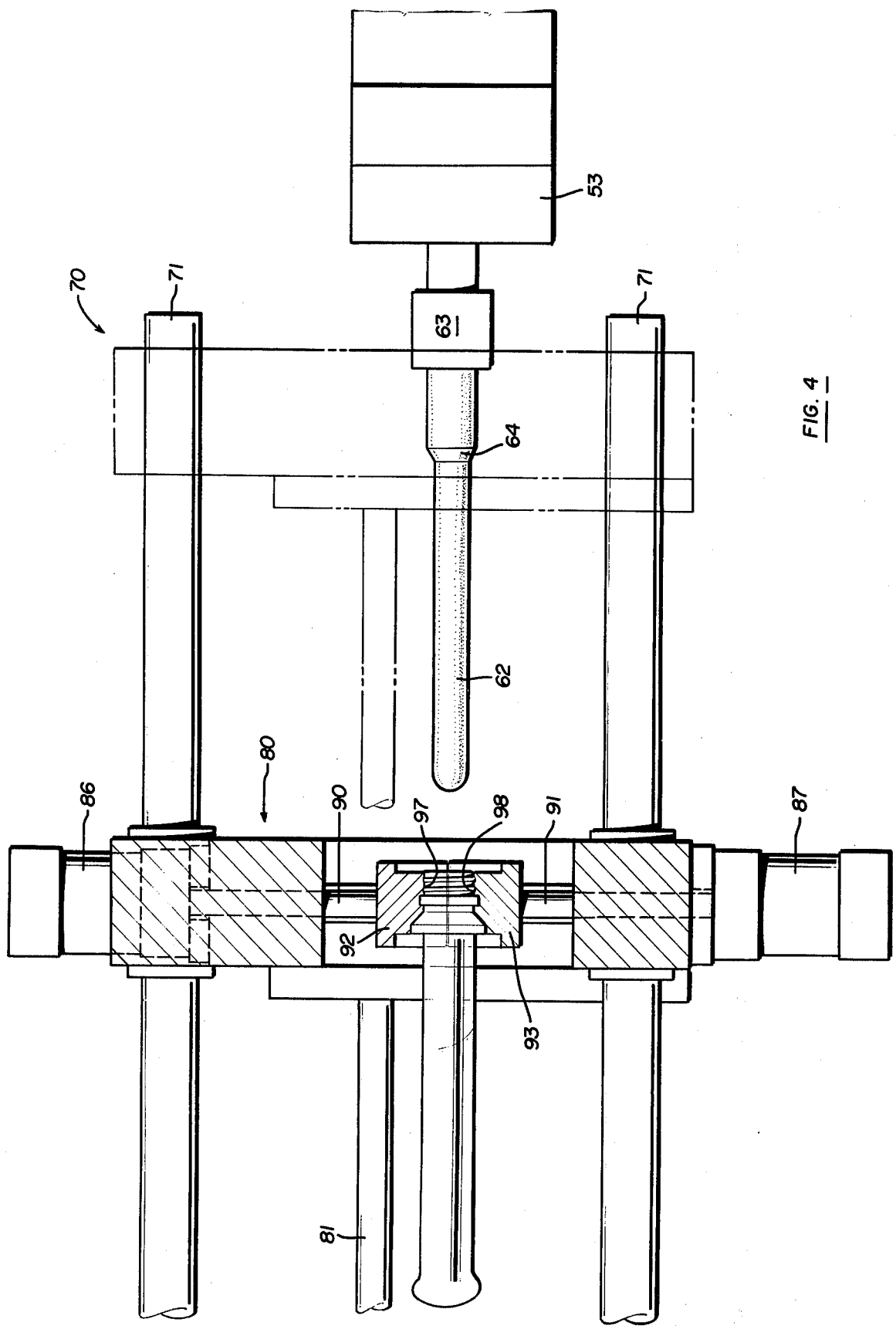
FIG. 4 is a side elevational detail of the ejection station and the horizontally reciprocable stripping carriage, taken along plane 4—4 in FIG. 5.
Figure 5:
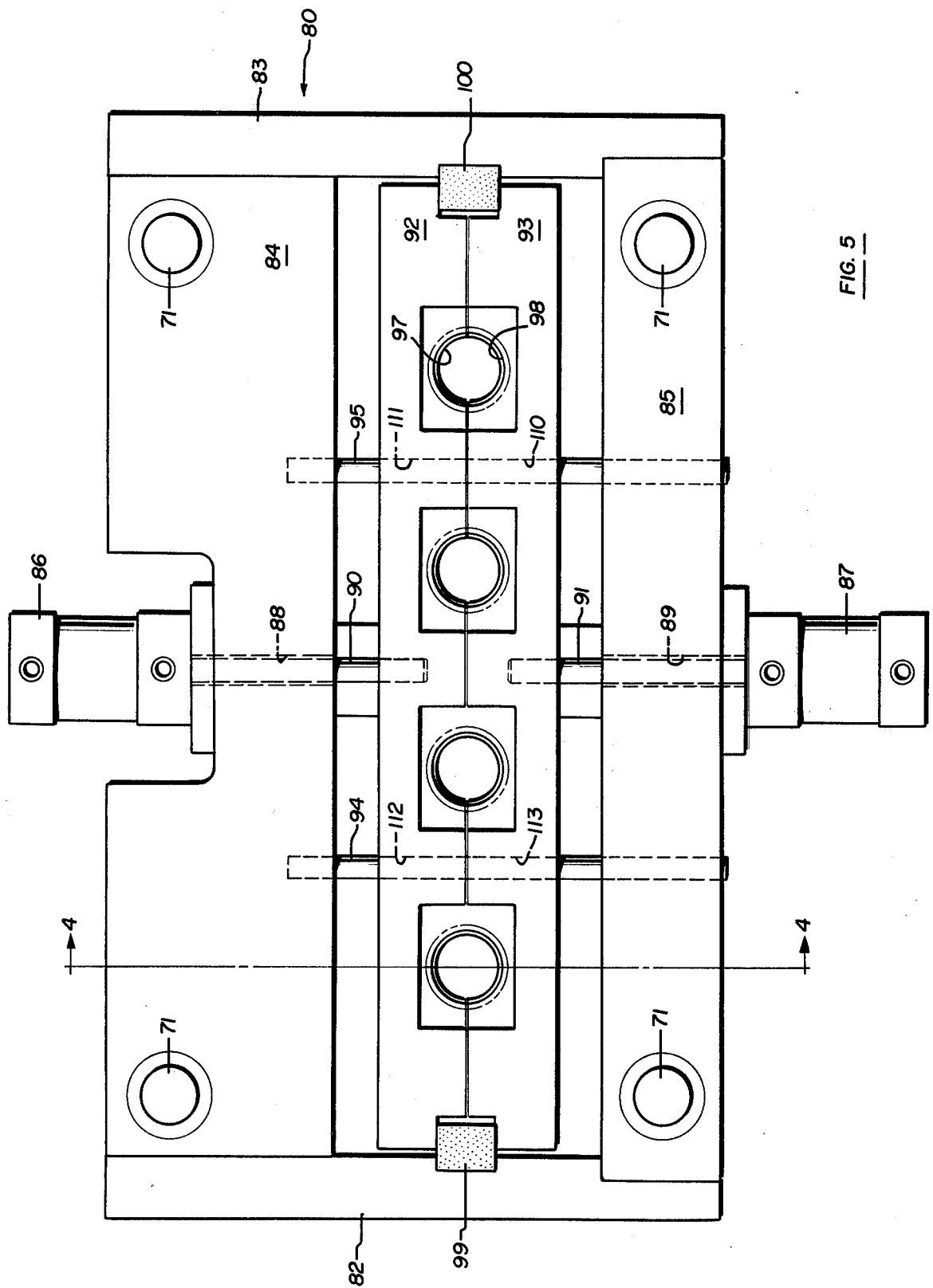
FIG. 5 is a frontal elevational view of the ejection system.

Turning now to the ejection station 70, illustrated in FIGS. 1, 4, and 5, four cantilever tie rods 71 extend from a support structure 72 to receive the cantilever core pins, as best shown in FIG. 4. A reciprocable ejection carriage 80 carried by the tie rods 71 is moved horizontally by a push rod 81 interconnected with suitable power means (not shown).

The horizontally movable carriage 80 includes two laterally disposed frame members 82 and 83 and two interconnected upper and lower horizontal frame members 84 and 85, each having suitable openings to receive the four tie rods 71. Two vertically aligned hydraulic cylinders 86 and 87 are respectively secured to the upper and lower frame members 84 and 85, which include vertical bores 88 and 89, respectively, to receive piston rods 90 and 91 associated with each of the hydraulic cylinders. The ends of the piston rods are rigidly secured to respective horizontal ejection blocks 92 and 93, having bores 110, 111, 112, and 113 to receive vertical guide rods 94 and 95. As best shown in FIG. 4, the ejection blocks 92 and 93 have several sets of semi-cylindrical gripping surfaces 97 and 98 corresponding in countour to the finish and neck support ledge on the molded article.

When the ejection blocks 92 and 93 are moved toward each other, i.e. in a radially inward direction relative to the axis of the core pins, to the illustrated position in abutment with blocks 99 and 100, the gripping surfaces 97 and 98 engage and grasp the finish and neck support region of the molded articles. Then, as the carriage 80 is moved from the position shown in phantom lines in FIG. 4 to the full line position of FIG. 4, the molded plastic parisons are stripped from the core pins. The ejection blocks 92 and 93 may then be immediately retracted by the hyraulic cylinders 86 and 87 to disengage the parisons to permit them to fall onto a conveyor or into a hopper for further processing. Alternatively, the ejection blocks may remain closed while the turret 50 is rotated to position the other set of core pins at the ejection station with freshly molded articles, during which time the stripped parisons are held in a horizontal cantilevered position to continue cooling, as illustrated in FIG. 4. During this time, optional cooling air currents may be directed onto the parisons. After rotation of the turret to position another set of core pins at the ejection station and after the release of the parisons from the ejection blocks, the carriage 80 is horizontally displaced back to the phantom-line position shown in FIG. 4 to strip the next set of parisons from the core pins. Normally, the parisons will be stripped from the core pins just prior to indexing the turret, in order to maintain the parisons on the cooled core pins as long as practical during the overall cycle.

In the overall operation, one of the sets of core pins is enclosed within the mold cavities 32 to receive flowable plastic material from the injection molding machine 10 and the runner housing 20. At the same time, the second set of core pins is positioned at the cooling and ejection station 70 between the cantilever tie rods 71. During the injection molding step, the horizontally displacable carriage 80 is moved from the position shown in FIG. 4 to a position where the gripping surfaces are in alignment with the finish and neck support region of the parison. Naturally, the ejection blocks 92 and 93 are in a retracted position during the horizontal carriage movement toward the turret. After the carriage 80 has been moved into proper alignment with the molded article, the ejection blocks 92 and 93 are moved toward each other by respective piston rods 90 and 91 of hydraulic cylinders 86 and 87 to place gripping surfaces 97 and 98 into engagement with the appropriate portion of the molded parisons. Immediately thereafter, the carriage 80 is reciprocated back to the position shown in FIG. 4 to strip the parisons from the core pins. As discussed previously, the ejection blocks may be opened promptly to drop the molded parisons; alternately, the ejection blocks may remain closed for a dwell period to hold the parisons in a horizontal cantilever position for continued cooling as the turret is raised and rotated.

After one set of parisons has been injected onto one set of the core pins and the previously molded set of parisons has been stripped from the other set of core pins, the molds are opened, as shown in FIG. 3, so that the turret may be rotated to repeat the cycle sequentially.

Figure 7:
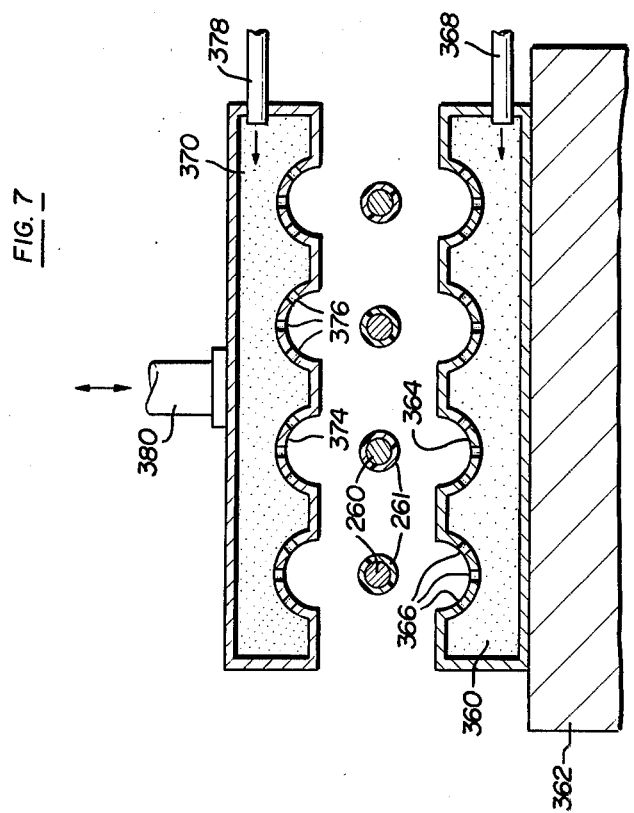
FIGS. 6 and 7 relate to a second embodiment, which includes an optional cooling station between the injection molding and ejection stations.
Figure 6:
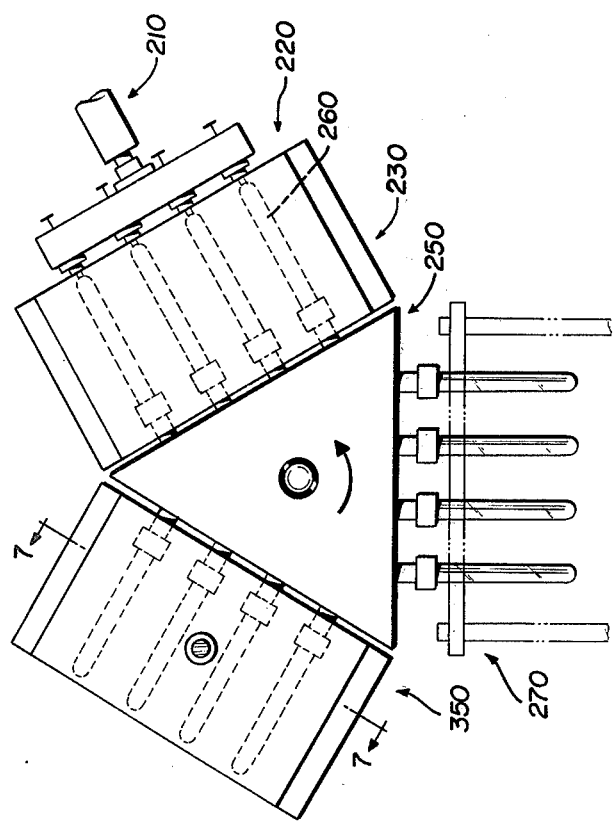

The Embodiment Of FIGS. 6 and 7

FIG. 6 illustrates a second embodiment identical in every respect to the previously disclosed embodiment, with the exception that an additional cooling station 350 is interposed between the injection molding station 230 and the ejection and cooling station 270. Accordingly, the vertically raisable and rotationally mounted turret 250 includes three sets of core pins 260 which are sequentially positioned at the three processing stations. Apparatus components in this embodiment which are identical to corresponding components in the embodiment of FIGS. 1-5 are represented by reference numerals which are greater by 200 than the corresponding reference numerals in the prior embodiment. For example, the plasticizer is indicated by reference numeral 210, the runner housing by reference numeral 220, and the ejection mechanism by reference numeral 270.

Referring more particularly to FIG. 7, the cooling station 350 is shown as including a lower plenum housing 360 which is supported on a base 362. The housing includes elongated semi-cylindrical surfaces 364 having ports 366 for directing streams of air onto the outer surfaces of the plastic parisons 261. Air is supplied to the interior of the lower plenum 360 by a supply passageway 368 that is connected with a suitable source of air under pressure.

An upper, vertically movable plenum housing 370 is substantially identical to the lower plenum housing 360 and includes a plurality of arcuate, semi-cylindrical surfaces 374 which have passageways 376 to also direct streams of air from the interior of the upper plenum housing 370 onto the external surfaces of parisons 261. Likewise, air under pressure is supplied to the interior of plenum housing 370 by a fluid passageway 378.

In operation, parisons are injected onto a set of core pins 260 at the injection molding station 230, while the sections of the molds are closed around the core pins. Thereafter, the upper press platen associated with the injection mold is raised and turret 250 is raised to an intermediate position between the upper and lower mold halves. Next, the turret 250 is rotated in a counter clockwise manner to position the freshly injection molded parisons 261 on the core pins 260 between the upper and lower plenum housings 370 and 360, respectively. During this indexing phase of the operation, the upper plenum housing 370 will be raised by a rod 380 to a position above that shown in FIG. 7; additionally, the core pins and plastic parisons will be above the position shown in FIG. 7.

After completion of the rotational indexing movement, turret 250 is lowered to position the core pins 260 and injection molded parisons 261 in the position shown in FIG. 7. After lowering the turret 250, or simultaneously with the lowering movement of the turret, the upper plenum housing 370 is downwardly displaced by rod 380 which is interconnected with a conventional power source, such as a hydraulic ram (not shown), to the position in FIG. 7. While the parisons are positioned at this location, streams of cooling air are directed through air delivery ports 366 and 376 onto the parison exterior surfaces for cooling. As discussed in connection with the prior embodiment, the parisons are simultaneously cooled on their interior by cooling fluid which is circulated through the interior of the core pins 260.

Next, the upper plenum housing 370 is raised, the turret is raised, and then the turret is indexed in a counter clockwise direction to displace the parisons from station 350 to station 270 for further cooling and ejection. The operation at station 270 is the same as that disclosed in connection with the operation at station 70 in the embodiment shown in FIGS. 1-5.

Figure 8:
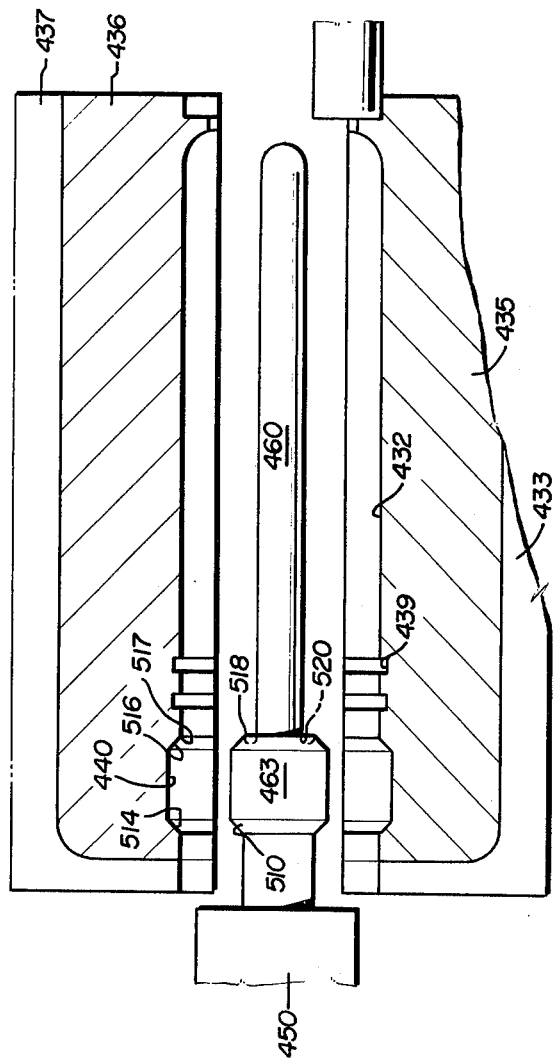
FIGS. 8-10 illustrate a preferred embodiment of a core pin, which includes an undercut in the enlarged head of the core pin to form the lip on the parison.
Figure 9:
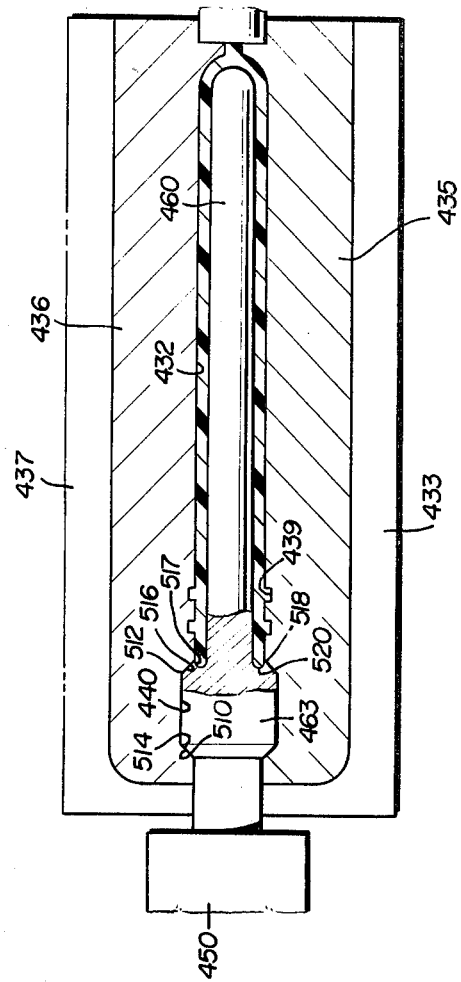
Figure 10:
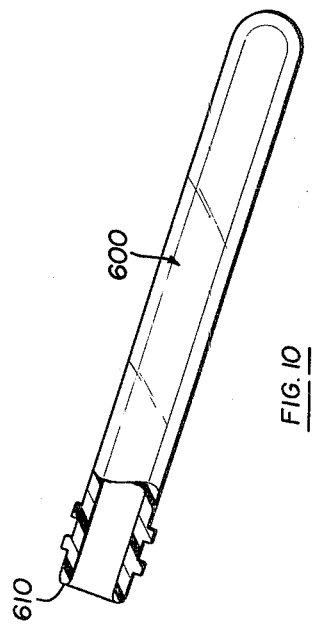

The Embodiment Of FIGS. 8–10

This invention also proposes a core pin design for forming a smooth annular end on the lip of an injection molded tubular article. This design eliminates a parting line along the annular end of the tubular cavity formed by mating core pin surfaces and surfaces on the sections of the injections molds, which form a ridge of material on the annular end surface of the molded product. Such a parting line ridge can be undesirable, for example, on the lip of a parison because this results in an undesirable parting line ridge on the lip of the blown article.

Referring to the drawings, FIG. 8 illustrates a core pin 460 as supported in a cantilevered manner from a turret or support 450 and interposed between the upper and lower injection mold sections. More specifically, a lower fixed mold half 435 is suitably secured to a fixed lower cavity retainer block 433 which is supported upon a base in the same manner as shown in FIG. 1. An upper mold half 436 is likewise suitably secured to an upper cavity retainer block 437 on an upper press platen (not shown) that is vertically movable in the same manner as discussed in connection with the embodiment of FIGS. 1–5.

In this embodiment, the core pin 460 includes an enlarged centering collar or boss 463 which includes oppositely tapering frusto-conical surfaces 510 and 512. The mold half sections 435 and 436 each include complementary-shaped surfaces 440, 514, and 516 to respectively engage the enlarged collar 463 and the frusto-conical tapering surfaces in order to stabilize and center the core pin 460 during the injection molding operation. Further, the mold halves include elongated semi-cylindrical molding surfaces 432 to form the exterior surface on the injection molded parison. Surfaces 432 may optionally include finish-forming surfaces 439. As shown by both FIGS. 8 and 9, the semi-cylindrical molding surfaces 432 intersect with frusto-conical surface 516 to form a shoulder at 517. As shown in FIG. 9, shoulder 517 mates with a corresponding shoulder 518 on the core pin, forming a parting line at an edge between the lip and the side walls of the tubular article, rather than on the annular end of the lip.

In accordance with this aspect of the invention, an undercut groove 520 is formed radially inwardly of the frusto-conical tapering surface 512 to form a smooth annular end surface for the tubular mold cavity. In preferred embodiment, the groove is generally arcuate in order to provide a rounded, smooth surface on the end of the molded parison, as shown by reference numeral 610 on parison 600 in FIG. 10. As illustrated, the undercut groove 520 extends from the shoulder 518 and blends into the elongated cylindrical molding surface on the core pin.

It will be apparent to those skilled in the art that the foregoing disclosure is exemplary in nature rather than limiting, the invention being limited only by the appended claims.

Accordingly, having clearly and completely defined by invention, I now claim:

1. A method of forming an essentially tubular, blowable, plastic parison, by the steps of:
    (1) surrounding an essentially cylindrical mold surface with respective closed mold halves at a molding station to form an essentially tubular injection molding cavity;
    (2) injection molding an essentially tubular parison around said cylindrical mold surface;
    (3) cooling the parison while said parison is only interiorally supported by the mold surface and while displacing the mold surface along an arcuate path to a position at a stripping station in axial alignment with an axially reciprocable stripping mechanism including a pair of radially spaced gripping surfaces which are closable upon an exterior portion of the parison;
    (4) axially displacing said pair of spaced gripping surfaces in unison from a position laterally spaced from the parison to a position in lateral alignment with said parison but radially separated therefrom;
    (5) radially inwardly displacing said gripping surfaces in unison to engage and grip an external surface portion of the parison; and then
    (6) axially displacing said gripping surfaces in unison with the parison held therebetween to strip the parison from the cylindrical mold surface;
    (7) supporting said parison in a cantilevered manner between said gripping surfaces for further cooling; and then
    (8) ejecting said parison by radially outwardly displacing the gripping surfaces in unison.

2. In a method of making blowable thermoplastic parisons on a high production basis, the steps of:
    (1) surrounding a first set of laterally spaced, essentially cylindrical cores with respective closed molding surfaces formed by a pair of vertically aligned, relatively movable mold halves at a molding station to form a plurality of laterally spaced, essentially tubular injection molding cavities;
    (2) simultaneously injecting flowable thermoplastic material into said plurality of cavities to form an essentially tubular, blowable thermoplastic parison surrounding each of said respective cores;
    (3) opening the mold halves to expose the injection molding parisons, as supported on the cylindrical cores;
    (4) displacing said first set of cores in unison from the molding station along a predetermined arcuate path to a parison ejection station, while simultaneously displacing a second set of laterally spaced cores along an arcuate path to the molding station;
    (5) performing steps (1), (2), and (3) while said second set of cores are at the molding station, and while stripping the tubular parisons from the first set of cores at said ejection station by the steps of:
        (a) radially displacing sections of respective gripping surfaces toward each other to engage a peripheral surface portion of each of said parisons;
        (b) laterally displacing the gripping surfaces coaxially and concentrically of each of the respective cylindrical cores, while engaging said peripheral parison surface portions, to a position laterally spaced from said cores; and then
        (c) radially displacing the sections of the respective gripping surfaces away from each other to disengage the parisons and permit their removal; and
    (6) displacing said first and second sets of cores along predetermined arcuate paths from their respective positions at the ejection and molding stations to position the first set of cores at the molding station to repeat the foregoing steps and to position the second set of cores at the ejection station for the performance of Steps (5a, b, and c); and (7) performing Step (5c) after the performance of Step (6), to hold said parisons in a cantilevered position for cooling.

3. In a method of injection molding parisons around a plurality of horizontal sets of core pins mounted in cantilevered manner on a rotatable and vertically movable indexing turret, the steps of:
   (1) rotating the turret (a) to position one set of core pins with parisons injection molded thereon at an ejection station and (b) to position a second set of core pins between upper and lower vertically spaced mold halves at an injection molding station;
   (2) lowering the turret (a) to axially align the first set of core pins with respective, radially spaced sections of annular gripping surfaces that are laterally spaced from the free cantilevered end of the parisons and (b) to position the second set of core pins within half-sections of a plurality of respective injection molding cavities formed in the lower mold half;
   (3) lowering the upper mold half to completely surround the second set of core pins within a plurality of respective injection molding cavities, and thereafter injecting flowable plastic material into the mold cavities to form parisons around the second set of core pins;
   (4) stripping the parisons from said one set of core pins at the ejection station by (a) transversely moving the gripping surface sections toward the turret to a position into radial alignment with a portion of each respective parison, (b) closing the gripping surfaces around respective parisons, (c) transversely moving the gripping surfaces away from the turret to a position laterally spaced from the free cantilevered end of the core pins, (d) holding the parison in a cantilevered position for further cooling; and (e) opening the gripping surfaces to release the parisons;
   (5) raising the upper mold half after the performance of Step (3); and
   (6) raising the turret after the performance of Steps (4) and (5) to accommodate its rotary indexing for positioning core pins successively at the molding and ejection stations.

4. The method as defined in claim 3, wherein the turret includes a third set of core pins, characterized in Step (1) by displacing the third set of core pins with respective injection molded articles thereon from the injection molding station to an intermediate cooling station.

5. A method of forming an essentially tubular, blowable, plastic parison by the steps of:
   (1) positioning a parison core pin at an injection station;
   (2) surrounding the core pin with respective closed mold halves at said injection station to form a tubular injection molding cavity;
   (3) injection molding an essentially tubular parison of plastic material around said pin;
   (4) completely removing said mold halves from contact with said parison whereby said parison is only supported interiorly by said pin;
   (5) cooling the parison while supported on the pin and displacing the pin along an arcuate path to a position at a cooling station;
   (6) cooling the parison further while supported on the mold surface and displacing the mold surface along an arcuate path to a position at a stripping station in axial alignment with an axially reciprocable stripping mechanism including a pair of radially spaced gripping surfaces which are closable upon a portion of said parison;
   (7) axially displacing said pair of spaced gripping surfaces in unison from a position laterally spaced from said parison to a position in lateral alignment with said parison but radially separated therefrom;
   (8) radially inwardly displacing said gripping surfaces in unison to engage and grip an external surface portion of the parison; and
   (9) axially displacing said gripping surfaces in unison with said parison held therebetween to strip said parison from said core pin;
   (10) holding the parison in a cantilevered position for further cooling; and then
   (11) moving the core pin toward the injection station preparatory to the performance of Steps (1) through (10).

* * * * *